United States Patent [19]

Takamizawa et al.

[11] 4,273,907
[45] Jun. 16, 1981

[54] BENZOIN-BONDED ORGANOPOLYSILOXANES AND METHOD FOR THE PREPARATION THEREOF

[75] Inventors: Minoru Takamizawa, Annaka; Fumio Okada, Takasaki; Yasuaki Hara; Hisashi Aoki, both of Gunma, all of Japan

[73] Assignee: Shin-Etsu Chemical Co., Ltd., Tokyo, Japan

[21] Appl. No.: 58,539

[22] Filed: Jul. 18, 1979

[51] Int. Cl.$^3$ ............................................. C08G 77/04
[52] U.S. Cl. ........................................ 528/29; 528/29; 528/18; 528/19; 528/20; 528/21; 528/25; 556/436
[58] Field of Search ...................... 528/29, 17, 18, 19, 528/20, 21, 25; 525/474; 260/448.2 E, 448.2 R, 448.2 B

[56] References Cited
U.S. PATENT DOCUMENTS

| | | | |
|---|---|---|---|
| 3,636,026 | 1/1972 | Fuhr et al. | 204/159.22 |
| 3,932,339 | 1/1976 | McLeod | 528/29 |

*Primary Examiner*—Melvyn I. Marquis
*Attorney, Agent, or Firm*—Toren, McGeady and Stanger

[57] ABSTRACT

The invention provides a novel class of organopolysiloxane compounds having at least one benzoin group represented by the general formula

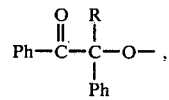

in which Ph is a phenyl group and R is a hydrogen atom or an alkyl group, bonded to the silicon atom in a molecule. The benzoin-bonded organopolysiloxane compounds can readily be prepared by the dehydrohalogenation, dehydrogenation, dehydration or dealkoholation condensation reaction between a corresponding organopolysiloxane having silicon-bonded halogen atoms, hydrogen atoms, hydroxy groups or alkoxy groups and an α-substituted or unsubstituted benzoin compound in the presence of a suitable reaction promotor or a condensation catalyst.

12 Claims, No Drawings

BENZOIN-BONDED ORGANOPOLYSILOXANES AND METHOD FOR THE PREPARATION THEREOF

BACKGROUND OF THE INVENTION

The present invention relates to a novel organopolysiloxane compound having at least one α-substituted or unsubstituted benzoin group expressed by the formula

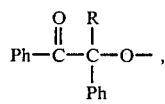

where Ph is a phenyl group and R is a hydrogen atom or an alkyl group, bonded to the silicon atom in a molecule of the organopolysiloxane and a method for the preparation thereof.

There have been known several organosilane compounds of silyl esters having one benzoin group of the above formula bonded to the silicon atom of an organosilane compound (see, for example, U.S. Pat. No. 3,636,026) but no organopolysiloxane compounds having the benzoin group are hitherto known.

SUMMARY OF THE INVENTION

Thus, an object of the present invention is to provide a novel organopolysiloxane compound having at least one α-substituted or unsubstituted benzoin group expressed by the general formula

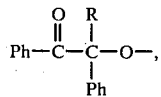 (I)

where Ph is a phenyl group and R is a hydrogen atom or an alkyl group having from 1 to 4 carbon atoms, in a molecule as bonded to the silicon atom.

The organopolysiloxane of the present invention, which is a novel compound hitherto unknown, is represented by the general formula $(Q)_a(R^1)_{3-a}Si-O+Si(Q)(R^2)-O]_{\overline{m}}[Si(R^2)_2-O]_{\overline{n}}-Si(Q)_a(R^1)_{3-a}$, (II)

Where Q is an α-substituted or unsubstituted benzoin group expressed by the above general formula (I), $R^1$ is a monovalent hydrocarbon group having from 1 to 6 carbon atoms, $R^2$ is a substituted or unsubstituted monovalent hydrocarbon group, a is 0, 1 or 2, m is 0 or a positive integer with the proviso that a and m are not simultaneously equal to zero, and n is 0 or a positive integer.

These organopolysiloxane compounds can be prepared by the condensation reaction of the corresponding functional organosiloxane represented by the general formula $(X)_a(R^1)_{3-a}Si-O+SI(X)(R^2)-O]_{\overline{m}}[Si(R^2)_2-O]_{\overline{n}}-Si(X)_a(R^1)_{3-a}$, (III)

where $R^1$, $R^2$, a, m and n each have the same meaning as defined above and X is a functional group selected from the class consisting of halogen atoms, a hydroxy group, a hydrogen atom and alkoxy groups, with benzoin or an α-substituted benzoin in the presence of a suitable reaction promotor or a condensation catalyst.

The novel organopolysiloxane compounds of the invention are useful, for example, as a photosensitizer in a photocurable organopolysiloxane composition.

DETAILED DESCRIPTION OF THE PREFERRED EMBODIMENTS

The organopolysiloxane compound of the general formula (II) can alternatively be expressed by the unit formula below:

$[(Q)_a(R^1)_{3-a}SiO_{0.5}]_2[Si(Q)(R^2)O]_m[Si(R^2)_2O]_n$, (IV)

where Q, $R^1$, $R^2$, a, m and n each have the same meaning as defined above.

In the formulas (II) or (IV), Q is the benzoin group of the formula (I) in which R is a hydrogen atom or an alkyl group having from 1 to 4 carbon atoms such as methyl, ethyl, propyl and butyl groups. Among them, those compounds with a methyl group as the group R are easily prepared in comparison with the compounds with higher alkyl groups. $R^1$ denotes a monovalent hydrocarbon group having from 1 to 6 carbon atoms such as an alkyl group exemplified by methyl, ethyl, propyl, butyl, pentyl and hexyl groups, phenyl group, and an alkenyl group exemplified by vinyl and allyl groups and $R^2$ is a substituted or unsubstituted monovalent hydrocarbon group such as alkyl, aryl and alkenyl groups and groups derived therefrom by the substitution of part or all of the hydrogen atoms thereof with halogen atoms, cyano groups and the like.

The above general formulas and the definitions of the symbols require that the inventive organopolysiloxane compound has at least one benzoin group of the general formula (I) per molecule regardless of the position of the silicon atom to which it is bonded.

In the following, several of the examples in conformity with the above general formula (II) or (IV) and the definitions of the symbols described above are given. In the structural formulas given below and thereafter, Me, Et, Vi and Ph each denote methyl, ethyl, vinyl and phenyl groups, respectively, and $Q^1$ and $Q^2$ each denote a benzoin group and an α-methylbenzoin group expressed by the following formulas, respectively.

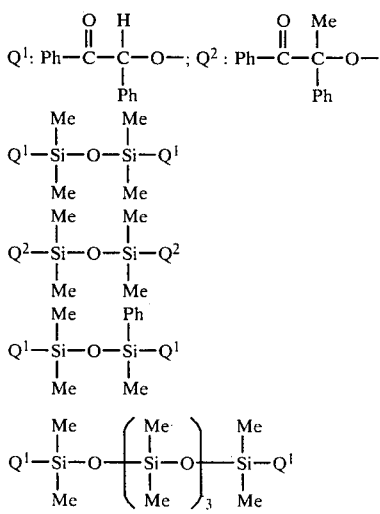

-continued

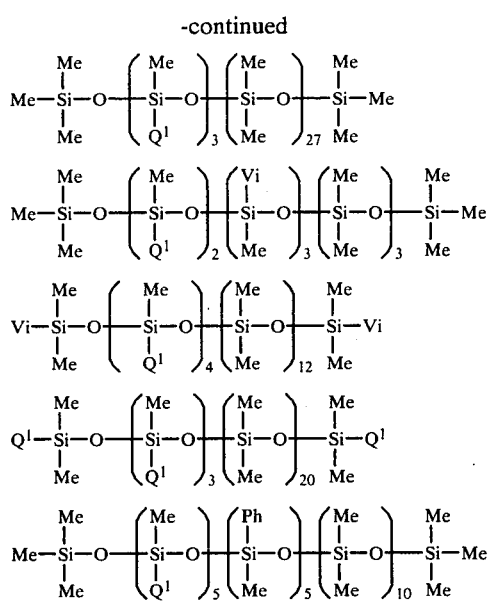

The above given benzoin-bonded organopolysiloxane compounds of the present invention can readily be prepared by the condensation reaction of the corresponding organopolysiloxane represented by the general formula (III) above with benzoin or an α-substituted benzoin, X in the formula (III) being, as described above, a halogen atom, e.g. chlorine, a hydroxy group, a hydrogen atom or an alkoxy group, e.g. methoxy and ethoxy groups, by the formation of the respective condensation product of hydrogen halide, water, molecular hydrogen or alcohol. The condensation reaction is performed in a solution with an organic solvent such as benzene, toluene and xylene in the presence of a reaction promotor or a condensation catalyst. The reaction promotor or the condensation catalyst may differ according to the types of the condensation reaction. For example, an organic amine compound, especially, tertiary amine, e.g. triethylamine, tributylamine and the like, or urea is employed as an acceptor for the hydrogen halide when the condensation reaction is a dehydrohalogenation reaction undertaken between a halogen-containing organopolysiloxane and a benzoin compound while the dehydrogenation condensation, dehydration condensation and dealcoholation condensation can be catalytically accelerated by the catalyst such as dibutyltin dilaurate, zinc dust, sodium methylate and hydroxylamine; carboxylic acid salts of organotin compounds; and tin (II) dioctoate and titanic acid esters, respectively. The condensation reaction is carried out usually at a temperature ranging from room temperature to about 100° C. but it is optional to carry out the reaction at a further increased temperature up to the refluxing temperature of the reaction mixture under atmospheric pressure.

Following are the examples to illustrate the inventive organopolysiloxane compounds and the method for the preparation thereof in further detail.

EXAMPLE 1

Into a flask of 500 ml capacity were introduced 46.6 g (0.22 mole) of benzoin, 20.5 g (0.22 mole) of α-picoline and 100 ml of toluene to form a homogeneous mixture and then 20.3 g (0.1 mole) of 1,3-dichlorotetramethyldisiloxane was added dropwise into the mixture followed by agitation for 60 minutes at a temperature of 50° to 60° C. Thereafter, the precipitated hydrochloride of α-picoline was removed by filtration and the excess of α-picoline and toluene were removed by distillation under reduced pressure from the reaction mixture to leave 53.1 g of a white, solid product melting at 70°-72° C.

The results of the elementary analysis undertaken with this product were as follows supporting that the compound was 1,3-dibenzoin-tetramethyldisiloxane $C_{32}H_{34}O_5Si_2$.

|    | Found  | Calculated |
|----|--------|------------|
| C  | 69.2%  | 69.27%     |
| H  | 6.3%   | 6.19%      |
| Si | 10.0%  | 10.12%     |

The above given yield of the product was 95.9% of the theoretical value.

EXAMPLE 2

Into a flask of 1 liter capacity were introduced 93.3 g (0.44 mole) of benzoin, 44.4 g (0.44 mole) of triethylamine and 500 ml of toluene to form a homogeneous mixture and 268.6 g (0.1 mole) of a chlorine-containing organopolysiloxane expressed by the formula

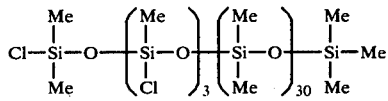

was added dropwise into the mixture followed by agitation for 1 hour at a temperature of 50° to 60° C. Thereafter, the precipitated hydrochloride of triethylamine was removed by filtration and excess of triethylamine and toluene were removed by distillation to leave 290 g of a viscous, light yellow liquid product having a viscosity of 87 centistokes at 25° C. and a refractive index of 1.4430 at 25° C. The results of the elementary analysis supported that the liquid product was a benzoin-containing organopolysiloxane expressed by the formula:

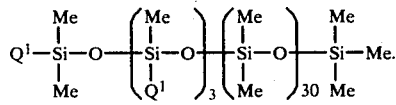

The above given yield of the product was 85.6% of the theoretical value.

EXAMPLE 3

Into a flask of 1 liter capacity were introduced 163.2 g (0.77 mole) of benzoin, 77.8 g (0.77 mole) of triethylamine and 500 ml of toluene to form a homogeneous mixture and 141.6 g (0.1 mole) of chlorine-containing organopolysiloxane expressed by the formula

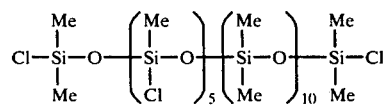

was added dropwise to the mixture followed by agitation for 60 minutes at room temperature. Thereafter, the precipitated hydrochloride of triethylamine was removed by filtration and excess of triethylamine and toluene were removed by distillation to leave 242 g of a viscous liquid product having a viscosity of 103 centistokes at 25° C. and a refractive index of 1.4781 at 25° C., which was identified to be a benzoin-containing organopolysiloxane expressed by the formula:

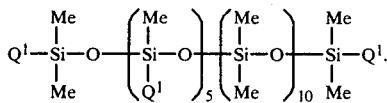

The above given yield of the product was 91.5% of the theoretical value.

EXAMPLE 4

Into a flask were introduced 4.7 g (0.022 mole) of benzoin, 2.8 g (0.028 mole) of triethylamine and 150 g of toluene to form a homogeneous mixture, into which 4.3 g (0.01 mole) of 1,9-dichlorsdecamethylpentasiloxane expressed by the formula

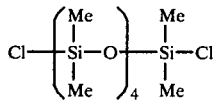

was added dropwise through a dropping funnel while the reaction mixture was kept at 20° to 30° C. with agitation followed by additional 60 minutes of agitation after the end of dropping. In the next place, the triethylamine hydrochloride precipitated was removed by filtration and toluene was distilled off from the reaction mixture to give 5.1 g of a reaction product which was solid at room temperature melting at 48° C. The results of the elementary analysis and infrared absorption spectroscopy supported that the product was identified to be 1,9-dibenzoin-decamethylpentasiloxane expressed by the formula:

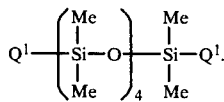

Several of the important infrared absorption bands were as follows:
1680 cm$^{-1}$ assigned to carbonyl =CO;
three bands in 1800–200 cm$^{-1}$ region assigned to aromatic ketones;
1600, 1580 and 1450 cm$^{-1}$ assigned to phenyl groups;
3000 cm$^{-1}$ assigned to

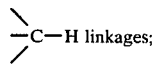
—C—H linkages;

1270, 810 and 705 cm$^{-1}$ assigned to

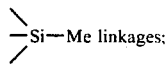
—Si—Me linkages;

and
1000 and 1100 cm$^{-1}$ assigned to

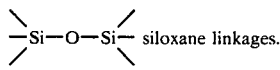
—Si—O—Si— siloxane linkages.

The above given yield of the product corresponded to 90.3% of the theoretical value.

EXAMPLE 5

A homogeneous reaction mixture was formed by introducing into a flask 49.7 g (0.22 mole) of α-methyl benzoin, 28.3 g (0.28 mole) of triethylamine and 150 g of toluene and then 131.3 g (0.1 mole) of an α,ω-dichlorodimethylpolysiloxane expressed by the formula

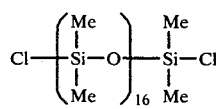

was added dropwise into the reaction mixture while the mixture was kept at 20° to 30° C. with agitation followed by subsequent temperature elevation to 50° to 60° C. and additional one hour of agitation to complete the reaction. Thereafter, the triethylamine hydrochloride precipitated was separated by filtration and toluene was removed by distillation from the reaction mixture to give 131 g of a viscous reaction product having a viscosity of 59.4 centistokes at 25° C. and a refractive index of 1.4453.

The reaction product thus obtained was identified to be an α,ω-di(α-methylbenzoin)-dimethylpolysiloxane expressed by the formula

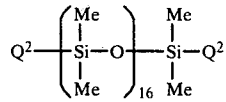

and the above given yield corresponded to 87.8% of the theoretical value.

EXAMPLE 6

The same experimental procedure as in Example 5 was repeated with the exception that the α,ω-dichlorodimethylsiloxanes used each in an amount of 0.1 mole were expressed by the formula

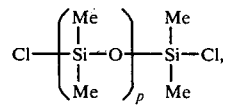

where p is 20, 49, 99 or 199 to give corresponding α,ω-di(α-methylbenzoin)-dimethylpolysiloxane having viscosities of 62.4, 121, 267 or 720 centistokes at 25° C., respectively.

EXAMPLE 7

Into a flask of 1 liter capacity were introduced 46.6 g (0.22 mole) of benzoin, 309 g (0.1 mole) of dimethylpolysiloxane terminated at both chain ends with hydrogen atoms directly bonded to the silicon atoms as expressed by the formula

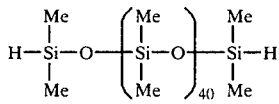

and 4 g of zinc dust and the reaction mixture was heated at 80° to 90° C. for 8 hours with agitation. During this period, evolution of hydrogen gas was observed. After the end of the above reaction time, the mixture was cooled to room temperature and excess of benzoin and zinc dust were removed by filtration to give 344 g of a reaction product, which was identified to be an $\alpha,\omega$-dibenzoindimethylpolysiloxane expressed by the formula:

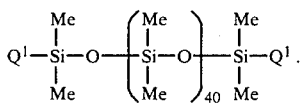

The above yield of the reaction product corresponded to 98% of the theoretical value.

EXAMPLE 8

A reaction mixture was formed by introducing into a flask 46.6 g (0.22 mole) of benzoin, 83.2 g (0.1 mole) of a dimethylpolysiloxane terminated at both chain ends with hydroxy groups as expressed by the formula

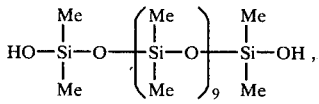

0.1 g of dibutyltin dilaurate and 200 ml of toluene and the reaction mixture was heated with agitation at the refluxing temperature of toluene for 4 hours. After the end of the above reaction time, the mixture was cooled and excess of benzoin was removed by filtration followed by removal of toluene by distillation to give 127 g of a reaction product which was identified to be an $\alpha,\omega$-dibenzoin-dimethylpolysiloxane expressed by the formula:

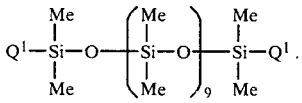

The above given yield of the product corresponded to 96% of the theoretical value.

EXAMPLE 9

A reaction mixture was formed by introducing into a flask 46.6 g (0.22 mole) of benzoin, 86.0 g (0.1 mole) of a dimethylpolysiloxane terminated at both chain ends with methoxy groups as expressed by the formula

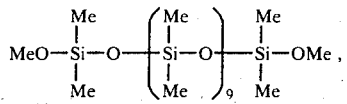

0.2 g of tin dioctoate and 200 ml of toluene and the reaction mixture was heated with agitation at the refluxing temperature of toluene for 6 hours. After the end of the above reaction time, excess of benzoin was removed by filtration and toluene and methyl alcohol produced by the condensation reaction were removed by distillation to give 129 g of a reaction product, which was identified to be an $\alpha,\omega$-dibenzoin-dimethylpolysiloxane expressed by the formula:

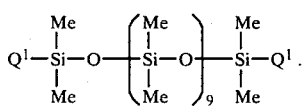

The above given yield of the product corresponded to 97.5% of the theoretical value.

EXAMPLE 10

Into a flask of 1 liter capacity were introduced 70.0 g (0.33 mole) of benzoin, 30.7 g (0.33 mole) of triethylamine and 300 ml of toluene to form a homogeneous reaction mixture into which 244.4 g (0.1 mole) of an organopolysiloxane expressed by the formula

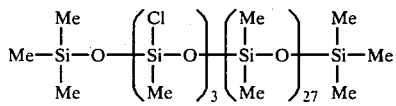

was added dropwise while the reaction mixture was maintained at a temperature of 20° to 30° C. with agitation and agitation was further continued for additional 60 minutes. Thereafter, triethylamine hydrochloride formed by the condensation reaction was removed from the reaction mixture by filtration and toluene was removed by distillation to give 276 g of a reaction product having a viscosity of 105 centistokes at 25° C. and a refractive index of 1.4424 at 25° C. The reaction product was identified to be a benzoin-bonded organopolysiloxane expressed by the formula:

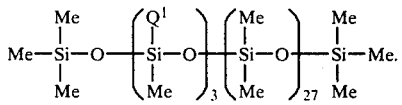

The above given yield of the product corresponded to 89.8% of the theoretical value.

EXAMPLE 11

Into a flask of 1 liter capacity were introduced 93.2 g (0.44 mole) of benzoin, 131.4 g (0.1 mole) of an organopolysiloxane expressed by the formula

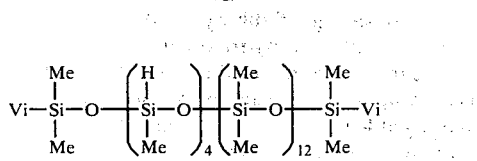

and 8 g of zinc dust to form a reaction mixture and the mixture was heated at a temperature of 80° to 90° C. with agitation for 8 hours, during which period evolution of hydrogen gas was observed. Thereafter, the reaction mixture was cooled to room temperature and excess of benzoin and zinc dust were removed by filtration to give 204 g of a reaction product, which was identified to be a benzoin-bonded organopolysiloxane expressed by the formula

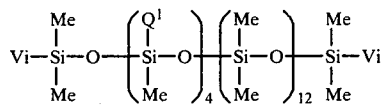

The above given yield of the product corresponded to 95.2% of the theoretical value.

What is claimed is:

1. A benzoin-bonded organopolysiloxane represented by the general formula $$(Q)_a(R^1)_{3-a}Si-O-[Si(Q)(R^2)-O]_m[Si(R^2)_2O]_n\text{-}Si(Q)_a(R^1)_{3-a},$$

Where Q is a benzoin group represented by the general formula

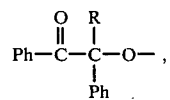

Ph is a phenyl group, R is a hydrogen atom or an alkyl group having from 1 to 4 carbon atoms, $R^1$ is a monovalent hydrocarbon group having from 1 to 6 carbon atoms, $R^2$ is a substituted or unsubstituted monovalent hydrocarbon group, a is a number of 0, 1 or 2, m is 0 or a positive integer with the proviso that a and m are not simultaneously equal to zero, and n is zero or a positive integer.

2. The benzoin-bonded organopolysiloxane as claimed in claim 1 wherein R is a hydrogen atom.

3. The benzoin-bonded organopolysiloxane as claimed in claim 1 wherein R is a methyl group.

4. The benzoin-bonded organopolysiloxane as claimed in claim 1 wherein $R^1$ is a methyl group or a vinyl group.

5. The benzoin-bonded organopolysiloxane as claimed in claim 1 wherein $R^2$ is a monovalent hydrocarbon group selected from the class consisting of methyl, phenyl and vinyl groups.

6. The benzoin-bonded organopolysiloxane as claimed in claim 1 wherein a is 1.

7. A benzoin-bonded organopolysiloxane represented by the general formula

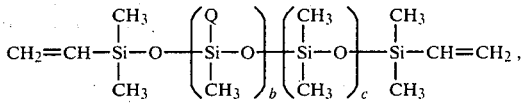

where Q is a benzoin group represented by the general formula

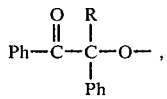

Ph is a phenyl group, R is a hydrogen atom or an alkyl group having from 1 to 4 carbon atoms, b is a positive integer and C is 0 or a positive integer.

8. A method for the preparation of a benzoin-bonded organopolysiloxane represented by the general formula $$(Q)_a(R^1)_{3-a}Si-O-[Si(Q)(R^2)-O]_m[Si(R^2)_2-O]_n\text{-}Si(Q)_a(R^1)_{3-a}$$

where Q is a benzoin group represented by the general formula

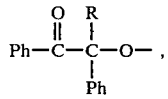

Ph is a phenyl group, R is a hydrogen atom or an alkyl group having from 1 to 4 carbon atoms, $R^1$ is a monovalent hydrocarbon group having from 1 to 6 carbon atoms, $R^2$ is a substituted or unsubstituted monovalent hydrocarbon group, a is a number of 0, 1 or 2, m is 0 or a positive integer with the proviso that a and m are not simultaneously equal to zero, and n is zero or a positive integer, which comprises reacting an organopolysiloxane having at least one functional group represented by the general formula $$(X)_a(R^1)_{3-a}Si-O-[Si(X)(R^1)-O]_m[Si(R^2)_2-O]_n\text{-}Si(X)_a(R^1)_{3-a}$$

where X is a functional group selected from the class consisting of halogen atoms, a hydrogen atom, a hydroxy group and alkoxy groups, and $R^1$, $R^2$, a, m and n each have the same meaning as defined above, with a benzoin compound represented by the general formula

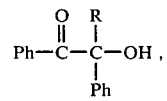

where Ph and R each have the same meaning as defined above.

9. The method as claimed in claim 8 wherein X is a halogen atom and the reaction of the organopolysiloxane having at least one functional group and the benzoin compound is carried out in the presence of a reaction promotor which is a compound selected from the class consisting of organic amine compounds and urea.

10. The method as claimed in claim 8 wherein X is a hydroxy group and the reaction of the organopolysiloxane having at least one functional group and the benzoin compound is carried out in the presence of a catalyst composed of carboxylic acid salts of an organotin compound.

11. The method as claimed in claim 8 wherein X is a hydrogen atom directly bonded to the silicon atom and the reaction of the organopolysiloxane having at least one functional group and the benzoin compound is carried out in the presence of a catalyst selected from the class consisting of dibutyltin dilaurate, zinc dust, sodium methylate and hydroxylamine.

12. The method as claimed in claim 8 wherein X is an alkoxy group and the reaction of the organopolysiloxane having at least one functional group and the benzoin compound is carried out in the presence of a catalyst selected from the class consisting of tin dioctoate and esters of titanic acid.

* * * * *